(12) United States Patent
Kaneko

(10) Patent No.: US 10,443,015 B2
(45) Date of Patent: Oct. 15, 2019

(54) REFRIGERATOR LUBRICATING OIL AND MIXED COMPOSITION FOR REFRIGERATOR

(71) Applicant: IDEMITSU KOSAN CO., LTD., Chiyoda-ku (JP)

(72) Inventor: Masato Kaneko, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/559,250

(22) PCT Filed: Mar. 23, 2016

(86) PCT No.: PCT/JP2016/059225
§ 371 (c)(1),
(2) Date: Sep. 18, 2017

(87) PCT Pub. No.: WO2016/158616
PCT Pub. Date: Oct. 6, 2016

(65) Prior Publication Data
US 2018/0094206 A1    Apr. 5, 2018

(30) Foreign Application Priority Data
Mar. 30, 2015 (JP) .................... 2015-070122

(51) Int. Cl.
| | | |
|---|---|---|
| *C09K 5/04* | (2006.01) | |
| *C10M 169/04* | (2006.01) | |
| *C10M 105/18* | (2006.01) | |
| *C10M 107/34* | (2006.01) | |
| *C10M 133/12* | (2006.01) | |
| *F25B 1/00* | (2006.01) | |

(52) U.S. Cl.
CPC ............ *C10M 169/04* (2013.01); *C09K 5/04* (2013.01); *C09K 5/045* (2013.01); *C10M 105/18* (2013.01); *C10M 107/34* (2013.01); *C10M 133/12* (2013.01); *F25B 1/00* (2013.01); *C09K 2205/126* (2013.01); *C10M 2209/1033* (2013.01); *C10M 2215/064* (2013.01); *C10N 2220/302* (2013.01); *C10N 2240/30* (2013.01)

(58) Field of Classification Search
CPC ............ C10M 169/04; C10M 133/12; C10M 107/34; C10M 105/18; C10M 2215/064; C10M 2209/1033; C09K 5/045; C09K 5/04; C09K 2205/126; F25B 1/00; C10N 2240/30; C10N 2220/302
USPC ......................................................... 252/68
See application file for complete search history.

(56) References Cited

U.S. PATENT DOCUMENTS

| | | | | |
|---|---|---|---|---|
| 2008/0132436 | A1 | 6/2008 | Sherman | |
| 2010/0029522 | A1* | 2/2010 | Tokiai | ............... C10M 169/041 508/462 |
| 2010/0108936 | A1* | 5/2010 | Kaneko | ............... C10M 169/04 252/68 |
| 2010/0175421 | A1* | 7/2010 | Kaneko | ................. C09K 5/045 62/468 |
| 2010/0205980 | A1* | 8/2010 | Dixon | .................... C09K 5/041 62/56 |
| 2011/0023531 | A1* | 2/2011 | Kaneko | ................. C09K 5/045 62/468 |
| 2011/0041530 | A1* | 2/2011 | Mouli | .................... C09K 5/045 62/119 |
| 2011/0049414 | A1* | 3/2011 | Kaneko | ................. C09K 5/045 252/68 |
| 2011/0057146 | A1* | 3/2011 | Kaneko | ................. C09K 5/045 252/68 |
| 2012/0132848 | A1* | 5/2012 | Sawada | ................. C09K 5/045 252/68 |
| 2012/0228541 | A1* | 9/2012 | Takigawa | ............... C09K 5/045 252/68 |
| 2013/0098101 | A1 | 4/2013 | Ishida | |
| 2015/0048271 | A1* | 2/2015 | Kaneko | ................. C09K 5/045 252/68 |
| 2016/0040094 | A1* | 2/2016 | Kaneko | ............. C10M 171/008 62/502 |
| 2016/0215235 | A1* | 7/2016 | Kaneko | ............... C10M 111/04 |
| 2017/0058174 | A1 | 3/2017 | Fukushima et al. | |
| 2017/0335232 | A1* | 11/2017 | Kaneko | ................. C08F 116/14 |
| 2018/0057766 | A1* | 3/2018 | Kaneko | .................... C09K 5/04 |

FOREIGN PATENT DOCUMENTS

| | | | |
|---|---|---|---|
| JP | 2008-115266 A | 5/2008 | |
| JP | 2009-191211 A | 8/2009 | |

(Continued)

OTHER PUBLICATIONS

Extended European Search Report dated Oct. 2, 2018 in Patent Application No. 16772497.0, 7 pages.

(Continued)

*Primary Examiner* — Douglas J McGinty
(74) *Attorney, Agent, or Firm* — Oblon, McClelland, Maier & Neustadt, L.L.P.

(57) ABSTRACT

Disclosed herein is a mixed composition for a refrigerator, which contains: a refrigerant containing at least one unsaturated fluorinated hydrocarbon compound selected from compounds represented by the following molecular formula (1): $C_pF_rH_s$, and a refrigerator lubricating oil containing, as a major component, a polyoxyalkylene glycol compound represented by the following general formula (2), and containing an amine compound in an amount of 1.0% by mass or more based on the total amount of the refrigerator lubricating oil: $R^1-[(OR^2)_m-OR^3]_n$ (2). According to the present disclosure, a mixed composition for a refrigerator can be provided that has a less possibility of autoignition under a high temperature environment even in an unexpected leakage thereof in a refrigerator using a refrigerant containing a slightly flammable refrigerant, and a refrigerator lubricating oil can be provided that is capable of being applied to the mixed composition for a refrigerator.

11 Claims, No Drawings

(56) References Cited

FOREIGN PATENT DOCUMENTS

| | | |
|---|---|---|
| JP | 2011-46881 A | 3/2011 |
| JP | 2011-46884 A | 3/2011 |
| JP | 2012-12532 A | 1/2012 |
| JP | 2012-131994 A | 7/2012 |
| WO | WO 01/90232 A2 | 11/2001 |
| WO | WO 2015/186670 A1 | 12/2015 |

OTHER PUBLICATIONS

Search Report dated Jun. 7, 2016, in PCT/JP2016/059225 filed Mar. 23, 2016.
Notice of Reasons for Refusal dated Aug. 6, 2019, in Japanese Patent Application No. 2017-5093348 filed Mar. 23, 2016 (with English transiation).

* cited by examiner

REFRIGERATOR LUBRICATING OIL AND MIXED COMPOSITION FOR REFRIGERATOR

TECHNICAL FIELD

The present invention relates to a mixed composition for a refrigerator using a refrigerant containing an unsaturated fluorinated hydrocarbon compound, and a refrigerator lubricating oil used with a refrigerant containing an unsaturated fluorinated hydrocarbon compound.

BACKGROUND ART

As the refrigerant for a refrigerator, a chlorine-containing compound, such as a chlorofluorocarbon, has been widely used, but in consideration of the environment protection, it is being replaced by a compound containing no chlorine, such as a hydrofluorocarbon (HFC), and a natural refrigerant, such as carbon dioxide.

Examples of the hydrofluorocarbon in practical use include a saturated hydrofluorocarbon (which may be hereinafter referred to as a saturated HFC), which is represented by 1,1,1,2-tetrafluoroethane, difluoromethane, pentafluoroethane, and 1,1,1-trifluoroethane (which may be hereinafter referred to as R134a, R32, R125, and R143a, respectively).

For a car air-conditioner, however, it is currently difficult to use carbon dioxide requiring high pressure as the major component of a refrigerant, and the use of a saturated HFC having a high global warming potential is also being avoided.

Under the circumstances, it is being considered in recent years to use an unsaturated fluorinated hydrocarbon compound, such as HFO1234ze and HFO1234yf, as a refrigerant capable of being used in the current car air-conditioner, irrespective of the low global warming potential thereof. Examples of a base oil of a refrigerator lubricating oil capable of being combined with the refrigerant containing the unsaturated fluorinated hydrocarbon compound include an oxygen-containing compound, such as a polyoxyalkylene glycol compound, a polyol ester compound, and a polycarbonate compound (see PTLs 1 to 3).

An open type car air-conditioner as an example of the refrigerator uses a rubber hose for the piping thereof, and thus water tends to enter the system. Therefore, a polyoxyalkylene glycol compound is used rather than a polyol ester compound, which tends to undergo hydrolysis through contact with water, so as to form a carboxylic acid causing deterioration.

In the case of a car air-conditioner, the mixture of the refrigerator lubricating oil and the refrigerant (which is referred to as a mixed composition for a refrigerator) in the refrigerator is necessarily assumed to leak into the engine compartment due to the breakage of the refrigerator in an unanticipated situation, for example, a car accident.

The refrigerant, the use of which is being considered in recent years, such as HFO1234ze and HFO1234yf, has slight flammability and is used with the refrigerator lubricating oil containing the flammable polyoxyalkylene glycol compound, and therefore there is a possibility that the leaking mixed composition for a refrigerator ignites under the high temperature environment in the engine compartment in an unanticipated situation.

Accordingly, for a car air-conditioner, such a refrigerator lubricating oil is demanded that is capable of preventing autoignition under the high temperature environment in the engine compartment, i.e., has a high autoignition point.

CITATION LIST

Patent Literatures

PTL 1: JP 2008-115266 A
PTL 2: JP 2011-046881 A
PTL 3: JP 2011-046884 A

SUMMARY OF INVENTION

Technical Problem

An object of the present invention is to provide a mixed composition for a refrigerator that has a less possibility of autoignition under a high temperature environment even in an unexpected leakage thereof in a refrigerator using a refrigerant containing a slightly flammable refrigerant, and to provide a refrigerator lubricating oil that is capable of being applied to the mixed composition for a refrigerator.

Solution to Problem

As a result of earnest investigations accumulated by the present inventors, it has been found that the autoignition point of the refrigerator lubricating oil can be increased by combining a refrigerator lubricating oil containing a polyoxyalkylene glycol compound having a particular structure as a major component and containing an amine compound, with a refrigerant containing an unsaturated fluorinated hydrocarbon compound, and thus the present invention has been completed based on the knowledge.

Accordingly, the present invention provides the following.

[1] A mixed composition for a refrigerator, containing:
a refrigerant containing at least one unsaturated fluorinated hydrocarbon compound selected from compounds represented by the following molecular formula (1):

$$C_pF_rH_s \qquad (1)$$

wherein p represents an integer of from 2 to 6; r represents an integer of from 1 to 11; and s represents an integer of from 1 to 11, provided that the compound has one or more carbon-carbon unsaturated bond in a molecule, and a refrigerator lubricating oil containing, as a major component, a polyoxyalkylene glycol compound represented by the following general formula (2), and containing an amine compound in an amount of 1.0% by mass or more based on the total amount of the refrigerator lubricating oil:

$$R^1-[(OR^2)_m-OR^3]_n \qquad (2)$$

wherein $R^1$ is selected from a hydrogen atom, an alkyl group having a number of carbon atoms of from 1 to 10, an acyl group having a number of carbon atoms of from 2 to 10, an aliphatic hydrocarbon group having a number of carbon atoms of from 1 to 10 and having from 2 to 6 bonding sites, and a substituent having a number of carbon atoms of from 3 to 15 and containing a heterocyclic ring which has oxygen and/or sulfur as a heteroatom; $R^2$ represents an alkylene group having a number of carbon atoms of from 2 to 4; $R^3$ represents a hydrogen atom, an alkyl group having a number of carbon atoms of from 1 to 10, or an acyl group having a number of carbon atoms of from 2 to 10; n represents an integer of from 1 to 6; and m represents a number such that an average value of m×n is from 6 to 80.

[2] The mixed composition for a refrigerator according to the items [1], wherein the refrigerant consists only of the unsaturated fluorinated hydrocarbon compound.

[3] The mixed composition for a refrigerator according to the items [1] or [2], wherein the unsaturated fluorinated hydrocarbon compound is a fluoride of propene.

[4] The mixed composition for a refrigerator according to the items [3], wherein the fluoride of propene is at least one selected from isomers of pentafluoropropene, 3,3,3-trifluoropropene, and 1,3,3,3-tetrafluoropropene.

[5] The mixed composition for a refrigerator according to any one of the items [1] to [4], wherein the refrigerator lubricating oil contains the amine compound in an amount of 1.0% by mass or more and 5.0% by mass or less based on the total amount of the refrigerator lubricating oil.

[6] The mixed composition for a refrigerator according to any one of the items [1] to [5], wherein the amine compound is at least one selected from diphenylamine, dioctylphenylamine, butylphenyloctylphenylamine, and N-phenyl-N'-isopropyl-p-phenylamine.

[7] The mixed composition for a refrigerator according to any one of the items [1] and [3] to [6], wherein the refrigerant contains at least one saturated fluorinated hydrocarbon compound selected from 1,1-difluoroethane, trifluoroethane, tetrafluoroethane, and pentafluoroethane.

[8] The mixed composition for a refrigerator according to any one of the items [1] to [7], wherein the mixed composition for a refrigerator is used for a hot water supply system or a refrigerating and heating system of a car air-conditioner, an electric car air-conditioner, a gas heat pump system, an air conditioner, a refrigerating chamber, an automatic vending machine, or a showcase.

[9] The mixed composition for a refrigerator according to any one of the items [1] to [7], wherein the mixed composition for a refrigerator is used for a car air-conditioner or an electric car air-conditioner.

[10] The mixed composition for a refrigerator according to any one of the items [1] to [9], wherein the mixed composition for a refrigerator is used for a hot water supply system or a refrigerating and heating system, and the system has a water content therein of 300 ppm by mass or less and a residual air partial pressure therein of 10 kPa or less.

[11] A refrigerator lubricating oil that is used for a refrigerant containing at least one unsaturated fluorinated hydrocarbon compound selected from compounds represented by the following molecular formula (1):

$$C_pF_rH_s \quad (1)$$

wherein p represents an integer of from 2 to 6; r represents an integer of from 1 to 11; and s represents an integer of from 1 to 11, provided that the compound has one or more carbon-carbon unsaturated bond in a molecule, the refrigerator lubricating oil containing, as a major component, a polyoxyalkylene glycol compound represented by the following general formula (2), and containing an amine compound in an amount of 1.0% by mass or more based on the total amount of the refrigerator lubricating oil:

$$R^1-[(OR^2)_m-OR^3]_n \quad (2)$$

wherein $R^1$ is selected from a hydrogen atom, an alkyl group having a number of carbon atoms of from 1 to 10, an acyl group having a number of carbon atoms of from 2 to 10, an aliphatic hydrocarbon group having a number of carbon atoms of from 1 to 10 and having from 2 to 6 bonding sites, and a substituent having a number of carbon atoms of from 3 to 15 and containing a heterocyclic ring which has oxygen and/or sulfur as a heteroatom; $R^2$ represents an alkylene group having a number of carbon atoms of from 2 to 4; $R^3$ represents a hydrogen atom, an alkyl group having a number of carbon atoms of from 1 to 10, or an acyl group having a number of carbon atoms of from 2 to 10; n represents an integer of from 1 to 6; and m represents a number such that an average value of m×n is from 6 to 80.

[12] A lubricating method containing using a refrigerator lubricating oil in a refrigerator, using a refrigerant containing at least one unsaturated fluorinated hydrocarbon compound selected from compounds represented by the following molecular formula (1):

$$C_pF_rH_s \quad (1)$$

wherein p represents an integer of from 2 to 6; r represents an integer of from 1 to 11; and s represents an integer of from 1 to 11, provided that the compound has one or more carbon-carbon unsaturated bond in a molecule, the refrigerator lubricating oil containing, as a major component, a polyoxyalkylene glycol compound represented by the following general formula (2), and containing an amine compound in an amount of 1.0% by mass or more based on the total amount of the refrigerator lubricating oil:

$$R^1-[(OR^2)_m-OR^3]_n \quad (2)$$

wherein $R^1$ is selected from a hydrogen atom, an alkyl group having a number of carbon atoms of from 1 to 10, an acyl group having a number of carbon atoms of from 2 to 10, an aliphatic hydrocarbon group having a number of carbon atoms of from 1 to 10 and having from 2 to 6 bonding sites, and a substituent having a number of carbon atoms of from 3 to 15 and containing a heterocyclic ring which has oxygen and/or sulfur as a heteroatom; $R^2$ represents an alkylene group having a number of carbon atoms of from 2 to 4; $R^3$ represents a hydrogen atom, an alkyl group having a number of carbon atoms of from 1 to 10, or an acyl group having a number of carbon atoms of from 2 to 10; n represents an integer of from 1 to 6; and m represents a number such that an average value of m×n is from 6 to 80.

[13] A refrigerator including used therein:

a refrigerant containing at least one unsaturated fluorinated hydrocarbon compound selected from compounds represented by the following molecular formula (1):

$$C_pF_rH_s \quad (1)$$

wherein p represents an integer of from 2 to 6; r represents an integer of from 1 to 11; and s represents an integer of from 1 to 11, provided that the compound has one or more carbon-carbon unsaturated bond in a molecule, and a refrigerator lubricating oil containing, as a major component, a polyoxyalkylene glycol compound represented by the following general formula (2), and containing an amine compound in an amount of 1.0% by mass or more based on the total amount of the refrigerator lubricating oil:

$$R^1-[(OR^2)_m-OR^3]_n \quad (2)$$

wherein $R^1$ is selected from a hydrogen atom, an alkyl group having a number of carbon atoms of from 1 to 10, an acyl group having a number of carbon atoms of from 2 to 10, an aliphatic hydrocarbon group having a number of carbon atoms of from 1 to 10 and having from 2 to 6 bonding sites, and a substituent having a number of carbon atoms of from 3 to 15 and containing a heterocyclic ring which has oxygen and/or sulfur as a heteroatom; $R^2$ represents an alkylene group having a number of carbon atoms of from 2 to 4; $R^3$ represents a hydrogen atom, an alkyl group having a number of carbon atoms of from 1 to 10, or an acyl group having a number of carbon atoms of from 2 to 10; n represents an

integer of from 1 to 6; and m represents a number such that an average value of m×n is from 6 to 80.

Advantageous Effects of Invention

According to the present invention, an object thereof is to provide a mixed composition for a refrigerator that has a less possibility of autoignition under a high temperature environment even in an unexpected leakage thereof in a refrigerator using a refrigerant containing a slightly flammable refrigerant, and to provide a refrigerator lubricating oil that is capable of being applied to the mixed composition for a refrigerator.

DESCRIPTION OF EMBODIMENTS

Preferred embodiments of the present invention will be described in detail below.
[Mixed Composition for Refrigerator]
The mixed composition for a refrigerator of an embodiment of the present invention contains:
a refrigerant containing at least one unsaturated fluorinated hydrocarbon compound selected from compounds represented by the following molecular formula (1):

$$C_p F_r H_s \qquad (1)$$

wherein p represents an integer of from 2 to 6; r represents an integer of from 1 to 11; and s represents an integer of from 1 to 11, provided that the compound has one or more carbon-carbon unsaturated bond in a molecule, and
a refrigerator lubricating oil containing, as a major component, a polyoxyalkylene glycol compound represented by the following general formula (2), and containing an amine compound in an amount of 1.0% by mass or more based on the total amount of the refrigerator lubricating oil:

$$R^1 - [(OR^2)_m - OR^3]_n \qquad (2)$$

wherein $R^1$ is selected from a hydrogen atom, an alkyl group having a number of carbon atoms of from 1 to 10, an acyl group having a number of carbon atoms of from 2 to 10, an aliphatic hydrocarbon group having a number of carbon atoms of from 1 to 10 and having from 2 to 6 bonding sites, and a substituent having a number of carbon atoms of from 3 to 15 and containing a heterocyclic ring which has oxygen and/or sulfur as a heteroatom; $R^2$ represents an alkylene group having a number of carbon atoms of from 2 to 4; $R^3$ represents a hydrogen atom, an alkyl group having a number of carbon atoms of from 1 to 10, or an acyl group having a number of carbon atoms of from 2 to 10; n represents an integer of from 1 to 6; and m represents a number such that an average value of m×n is from 6 to 80.

The mixed composition for a refrigerator according to the present invention contains a refrigerator lubricating oil and a refrigerant. The refrigerant and the refrigerator lubricating oil will be described in more detail below.
[Refrigerant]
<Unsaturated Fluorinated Hydrocarbon Compound>
The refrigerator lubricating oil according to the present invention is used for the following refrigerant. The refrigerant contains at least one unsaturated fluorinated hydrocarbon compound selected from compounds represented by the following molecular formula (1):

$$C_p F_r H_s \qquad (1)$$

wherein p represents an integer of from 2 to 6; r represents an integer of from 1 to 11; and s represents an integer of from 1 to 11, provided that the compound has one or more carbon-carbon unsaturated bond in a molecule.

The molecular formula (1) shows the kinds and the numbers of the elements in the molecule, and the formula (1) represents an unsaturated fluorinated hydrocarbon compound having a number p of carbon atoms C of from 2 to 6. With having a number of carbon atoms of from 2 to 6, the unsaturated fluorinated hydrocarbon compound can have physical and chemical properties, such as a boiling point, a freezing point, and an evaporation latent heat, that are required for a refrigerant.

In the molecular formula (1), the bond types of the p carbon atoms represented by $C_p$ include a carbon-carbon single bond and an unsaturated bond, such as a carbon-carbon double bond. The carbon-carbon unsaturated bond is preferably a carbon-carbon double bond from the standpoint of the stability, and the unsaturated fluorinated hydrocarbon compound preferably has 1 or more unsaturated bond, such as a carbon-carbon double bond, in the molecule thereof, with the number thereof being preferably 1. Namely, at least one of the bond types of the p carbon atoms represented by $C_p$ is more preferably a carbon-carbon double bond.

Preferred examples of the unsaturated fluorinated hydrocarbon compound include fluorinated compounds of a linear or branched olefin having a number of carbon atoms of from 2 to 6 and a cyclic olefin having a number of carbon atoms of from 4 to 6.

Specific examples thereof include a fluorinated compound of ethylene having from 1 to 3 fluorine atoms introduced therein, a fluorinated compound of propene having from 1 to 5 fluorine atoms introduced therein, a fluorinated compound of butene having from 1 to 7 fluorine atoms introduced therein, a fluorinated compound of pentene having from 1 to 9 fluorine atoms introduced therein, a fluorinated compound of hexene having from 1 to 11 fluorine atoms introduced therein, a fluorinated compound of cyclobutene having from 1 to 5 fluorine atoms introduced therein, a fluorinated compound of cyclopentene having from 1 to 7 fluorine atoms introduced therein, and a fluorinated compound of cyclohexene having from 1 to 9 fluorine atoms introduced therein.

Among these unsaturated fluorinated hydrocarbon compounds, a fluorinated compound of propene is preferred, a propene compound having from 3 to 5 fluorine atoms introduced therein is more preferred, and preferred specific examples thereof include isomers of pentafluoropropene, 3,3,3-trifluoropropene, 1,3,3,3-tetrafluoropropene represented by HFO1234ze, and 2,3,3,3-tetrafluoropropene represented by HFO1234yf.

Among these, a propene compound having 4 fluorine atoms introduced therein is more preferred, and 2,3,3,3-tetrafluoropropene represented by HFO1234yf is particularly preferred.

In the present invention, the unsaturated fluorinated hydrocarbon compound may be used solely or as a combination of two or more kinds thereof.
<Additional Component>
In the present invention, the refrigerant may be a mixed refrigerant that contains an additional component in addition to the unsaturated fluorinated hydrocarbon compound, and for example, may contain a saturated fluorinated hydrocarbon compound. The saturated fluorinated hydrocarbon compound is preferably a fluorinated compound of an alkane having a number of carbon atoms of from 2 to 4, and is preferably at least one selected from 1,1-difluoroethane (R152a), a trifluoroethane, a tetrafluoroethane, and a pentafluoroethane, which are fluorides of ethane.

Examples of the trifluoroethane include 1,1,1-trifluoroethane (R143a) and 1,1,2-trifluoroethane (R143).

Examples of the tetrafluoroethane include 1,1,1,2-tetrafluoroethane (R134a) and 1,1,2,2-tetrafluoroethane (R134).

Examples of the pentafluoroethane include 1,1,1,2,2-pentafluoroethane (R125).

The saturated fluorinated hydrocarbon compound may be used solely or as a combination of two or more kinds thereof.

The refrigerant may contain carbon dioxide, and in this case, the refrigerant preferably contains the unsaturated fluorinated hydrocarbon compound, carbon dioxide, and an additional third component. Specifically, the refrigerant preferably contains 1,3,3,3-tetrafluoropropene (HFO-1234ze), carbon dioxide (R-744), and the third component that is selected from difluoromethane (R32), 1,1-difluoroethane (R152a), fluoroethane (R161), 1,1,1,2-tetrafluoroethane (R134a), propylene, propane, and mixtures thereof.

The refrigerant preferably contains the unsaturated fluorinated hydrocarbon compound represented by the molecular formula (1) as a major component. The term "containing as a major component" means that the refrigerant contains the compound in an amount of 50% by mass or more based on the total amount of the refrigerant, and the content thereof is preferably 70% by mass or more, more preferably 80% by mass or more, and further preferably 90% by mass or more, based on the total amount of the refrigerant. The additional component, such as the saturated fluorinated hydrocarbon compound, is preferably not blended, and the refrigerant preferably consists only of the unsaturated fluorinated hydrocarbon compound.

[Refrigerator Lubricating Oil]
<Base Oil>
(Polyoxyalkylene Glycol Compound)

The refrigerator lubricating oil according to the present invention contains, as a major component, a polyoxyalkylene glycol compound represented by the following general formula (2):

$$R^1—[(OR^2)_m—OR^3]_n \quad (2)$$

wherein $R^1$ is selected from a hydrogen atom, an alkyl group having a number of carbon atoms of from 1 to 10, an acyl group having a number of carbon atoms of from 2 to 10, an aliphatic hydrocarbon group having a number of carbon atoms of from 1 to 10 and having from 2 to 6 bonding sites, and a substituent having a number of carbon atoms of from 3 to 15 and containing a heterocyclic ring which has oxygen and/or sulfur as a heteroatom; $R^2$ represents an alkylene group having a number of carbon atoms of from 2 to 4; $R^3$ represents a hydrogen atom, an alkyl group having a number of carbon atoms of from 1 to 10, or an acyl group having a number of carbon atoms of from 2 to 10; n represents an integer of from 1 to 6; and m represents a number such that an average value of m×n is from 6 to 80.

In the general formula (2), the alkyl group in $R^1$ and $R^3$ may be any of straight-chain, branched, and cyclic. Specific examples of the alkyl group include a methyl group, an ethyl group, a n-propyl group, an isopropyl group, butyl groups of every kind, pentyl groups of every kind, hexyl groups of every kind, heptyl groups of every kind, octyl groups of every kind, nonyl groups of every kind, decyl groups of every kind, a cyclopentyl group, and a cyclohexyl group. When the number of carbon atoms of the alkyl group exceeds 10, there may be a case where the compatibility with the refrigerant is lowered to cause phase separation. The number of carbon atoms of the alkyl group is preferably from 1 to 6.

The alkyl group moiety of the acyl group in $R^1$ and $R^3$ may be any of straight-chain, branched, and cyclic. Specific examples of the alkyl group moiety in the acyl group include the similar groups having a number of carbon atoms of from 1 to 9 shown as the specific examples of the alkyl group. When the number of carbon atoms of the acyl group exceeds 10, there may be a case where the compatibility with the refrigerant is lowered to cause phase separation. The number of carbon atoms of the acyl group is preferably from 2 to 6.

In the case where both $R^1$ and $R^3$ each are an alkyl group or an acyl group, $R^1$ and $R^3$ may be the same as or different from each other.

In the case where n is 2 or more, the plural groups represented by $R^3$ in one molecule may be the same as or different from each other.

In the case where $R^1$ is an aliphatic hydrocarbon group having a number of carbon atoms of from 1 to 10 and having from 2 to 6 bonding sites, the aliphatic hydrocarbon group may be either chainlike or cyclic. Examples of the aliphatic hydrocarbon group having 2 bonding sites include an ethylene group, a propylene group, a butylene group, a pentylene group, a hexylene group, a heptylene group, an octylene group, a nonylene group, a decylene group, a cyclopentylene group, and a cyclohexylene group. Examples of the aliphatic hydrocarbon group having from 3 to 6 bonding sites include a residual group obtained by removing hydroxyl groups from a polyhydric alcohol, such as trimethylolpropane, glycerin, pentaerythritol, sorbitol, 1,2,3-trihydroxycyclohexane, and 1,3,5-trihydroxycyclohexane.

When the number of carbon atoms of the aliphatic hydrocarbon group exceeds 10, there may be a case where the compatibility with the refrigerant is lowered to cause phase separation. The number of carbon atoms thereof is preferably from 2 to 6.

In the case where $R^1$ is a substituent having a number of carbon atoms of from 3 to 15 and containing a heterocyclic ring which has oxygen and/or sulfur as a heteroatom, substituents having tetrahydrofuran, methyltetrahydrofuran, tetrahydrothiophene, methyltetrahydrothiophene, furfuryl, or tetrahydrofurfuryl in the structure thereof, and derivatives derived from the substituents are preferred. Among these, $R^1$ is preferably a tetrahydrofurfuryl group.

$R^2$ in the general formula (2) is an alkylene group having a number of carbon atoms of from 2 to 4, and examples of the oxyalkylene group as a repeating unit include an oxyethylene group, an oxypropylene group, and an oxybutylene group. The oxyalkylene groups in one molecule may be the same as each other, and two or more kinds of oxyalkylene groups may also be contained. It is preferred that at least an oxypropylene unit is contained in one molecule, and it is more preferred that 50% by mol or more of an oxypropylene unit is contained in the oxyalkylene unit.

In the general formula (2), n represents an integer of from 1 to 6, which is determined by the number of bonding sites of $R^1$. For example, in the case where $R^1$ is an alkyl group or an acyl group, n is 1, and in the case where $R^1$ is an aliphatic hydrocarbon group having 2, 3, 4, 5, or 6 bonding sites, n is 2, 3, 4, 5, or 6, respectively. m represents a number such that an average value of m×n is from 6 to 80, and when the average value of m×n is outside the range, the object of the present invention cannot be sufficiently achieved.

The polyoxyalkylene glycol compound represented by the general formula (2) encompasses a polyoxyalkylene glycol having a hydroxyl group at the end thereof, and may be preferably used when the content of the hydroxyl group is 50% by mol or less based on the total amount of the end group. When the content of the hydroxyl group exceeds 50% by mol, the hygroscopicity may be increased to lower the viscosity index, which is not preferred.

The polyoxyalkylene glycol compound is preferably a polyoxypropylene glycol dimethyl ether represented by the following general formula (3), a polyoxyethylene polyoxypropylene glycol dimethyl ether represented by the following general formula (4), a polyoxypropylene glycol monobutyl ether represented by the following general formula (5), a polyoxypropylene glycol diacetate, or the like, from the standpoint of the economic efficiency and the effects.

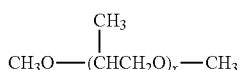  (3)

wherein x represents a number of from 6 to 80.

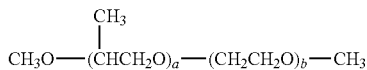  (4)

wherein a and b each represents a number of 1 or more providing a total thereof of from 6 to 80.

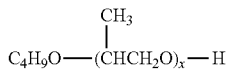  (5)

wherein x represents a number of from 6 to 80.

As for the polyoxyalkylene glycol compound represented by the general formula (2), any one of those described in detail in JP 2-305893 A may be used. In an embodiment according to the present invention, the term "containing the polyoxyalkylene glycol compound represented by the general formula (2) as a major component" means that the refrigerator lubricating oil contains the compound in an amount of 50% by mass or more based on the total amount of the refrigerator lubricating oil, and the content thereof is preferably 70% by mass or more, more preferably 80% by mass or more, and further preferably 90% by mass or more, based on the total amount of the refrigerator lubricating oil.

The base oil of the refrigerator lubricating oil preferably consists only of the polyoxyalkylene glycol compound represented by the general formula (2).

The polyoxyalkylene glycol compound represented by the general formula (2) preferably has a kinetic viscosity at 40° C. of from 10 to 500 mm²/s, and more preferably from 20 to 200 mm²/s.

The 100° C. kinetic viscosity thereof is preferably from 3 to 60 mm²/s, and more preferably from 5 to 30 mm²/s.

The viscosity index is preferably 100 or more, more preferably 150 or more, and particularly preferably 180 or more, from the standpoint of providing good viscosity characteristics. The upper limit of the viscosity index is 300 since the effect of the viscosity characteristics may reach the peak.

The polyoxyalkylene glycol compound represented by the general formula (2) preferably has a hydroxyl value of 15 mgKOH/g or less. When the hydroxyl value is 15 mgKOH/g or less, the polyoxyalkylene glycol compound represented by the general formula (2) may be appropriately prevented from being decomposed to provide good stability of the refrigerator lubricating oil.

The hydroxyl value herein is measured by the neutralization titration method according to JIS K0070.

<Amine Compound>

The refrigerator lubricating oil according to an embodiment of the present invention contains an additive in addition to the base oil. In the embodiment, an amine compound is contained in an amount of 1.0% by mass or more based on the total amount of the refrigerator lubricating oil. The upper limit of the amount thereof may be 10% by mass since the solubility of the refrigerator lubricating oil in the base oil may be deteriorated.

The amount of the amine compound blended is preferably 2.0% by mass or more and 5.0% by mass or less, and more preferably 3.0% by mass or more and 5.0% by mass or less, based on the total amount of the refrigerator lubricating oil, from the standpoint of the remarkable effect of increasing the autoignition point of the refrigerator lubricating oil.

Examples of the amine compound include a monoamine compound and a polyamine compound.

Examples of the monoamine compound include an aliphatic hydrocarbon compound having a linear or branched chain, a cyclic hydrocarbon compound, and an alicyclic hydrocarbon compound, which have a number of carbon atoms of from 1 to 18. Examples thereof include diphenylamine, phenyl-α-napthylamine, and an alkylphenyl-α-naphthylamine. An amine compound having an aromatic hydrocarbon group is preferred.

Examples of the polyamine compound include a dialkyldiphenylamine having an alkyl group having a number of carbon atoms of from 1 to 20, N,N'-diphenylethylenediamine, N,N'-diphenyl-p-phenylenediamine, N,N'-di-f-naphthyl-p-phenylenediamine, 6-(4-hydroxy-3,5-di-t-butylanilino)-2,4-bis(octylthyo)-1,3,5-triazine, and 1-(o-tolylbiguanide).

In the embodiment, however, phenothiazine is excluded from the amine compound.

Among these, at least one selected from diphenylamine, dioctylphenylamine, butylphenyloctylphenylamine, and N-phenyl-N'-isopropyl-p-phenylamine is preferred from the standpoint of the remarkable effect of increasing the autoignition point, and among these, diphenylamine and N-phenyl-N'-isopropyl-p-phenylamine are preferred, and N-phenyl-N'-isopropyl-p-phenylamine is particularly preferred from the standpoint of increasing the autoignition point.

The autoignition point of the refrigerator lubricating oil is preferably 370° C. or more, more preferably 380° C. or more, and particularly preferably 390° C. or more, in terms of autoignition point measured according to ASTM E659-78.

The increase of the autoignition point of the refrigerator lubricating oil may also increase the autoignition point of the mixed composition for a refrigerator.

[Other Additives]

The refrigerator lubricating oil according to an embodiment of the present invention may be blended with, in addition to the base oil, at least one additive selected from an extreme pressure agent, an oily agent, an antioxidant, an acid scavenger, a defoaming agent, and the like.

Examples of the extreme pressure agent include a phosphorus extreme pressure agent, such as a phosphate ester, an acidic phosphate ester, a phosphite ester, an acidic phosphite ester, and amine salts thereof. In the phosphorus extreme pressure agent, tricresyl phosphate, trithiophenyl phosphate, tri(nonylphenyl) phosphite, dioleyl hydrogen phosphite, 2-ethylhexyldiphenyl phosphite, and the like are particularly preferred from the standpoint of the extreme pressure property, the frictional characteristics, and the like.

Examples of the extreme pressure agent also include a metal salt of a carboxylic acid. The metal salt of a carboxylic acid referred herein is preferably a metal salt of a carboxylic acid having a number of carbon atoms of from 3 to 60, and further a fatty acid having a number of carbon atoms of from 3 to 30, and particularly from 12 to 30. Examples thereof also include metal salts of a dimer acid and a trimer acid of the fatty acid, and a dicarboxylic acid having a number of carbon atoms of from 3 to 30. Among these, metal salts of a fatty acid having a number of carbon atoms of from 12 to 30 and a dicarboxylic acid having a number of carbon atoms of from 3 to 30 are particularly preferred. The metal constituting the metal salt is preferably an alkali metal or an alkaline earth metal, and particularly an alkali metal may be optimum.

Examples of the extreme pressure agent other than those described above include a sulfur extreme pressure agent, such as a sulfurized oil or fat, a sulfurized fatty acid, a sulfurized ester, a thiocarbamate compound, a thioterpene compound, and a dialkyl thiodipropionate compound.

The amount of the extreme pressure agent blended thereto is generally from 0.001 to 5% by mass, and particularly from 0.005 to 3% by mass, based on the total amount of the refrigerator lubricating oil, from the standpoint of the lubricating property and the stability.

The extreme pressure agent may be used solely or as a combination of two or more kinds thereof.

Examples of the oily agent include an aliphatic saturated or unsaturated monocarboxylic acid, such as stearic acid and oleic acid, a polymerized fatty acid, such as a dimer acid and a hydrogenated dimer acid, a hydroxyfatty acid, such as ricinoleic acid and 12-hydroxystearic acid, an aliphatic saturated or unsaturated monohydric alcohol, such as lauryl alcohol and oleyl alcohol, an aliphatic saturated or unsaturated monoamine, such as stearylamine and oleylamine, and an aliphatic saturated or unsaturated monocarboxylic acid amide, such as lauric acid amide and oleic acid amid.

These compounds may be used solely or as a combination of two or more kinds thereof. The amount thereof blended is generally selected from a range of from 0.01 to 10% by mass, and preferably from 0.1 to 5% by mass, based on the total amount of the refrigerator lubricating oil.

As the antioxidant, a phenol antioxidant, such as 2,6-di-tert-butyl-4-methylphenol, 2,6-di-tert-butyl-4-ethylphenol, and 2,2'-methylenebis(4-methyl-6-tert-butylphenol), or an amine antioxidant, such as phenyl-α-naphthylamine and N,N'-diphenyl-p-phenylenediamine is preferably blended. The amount of the antioxidant blended is generally from 0.01 to 1.0% by mass, and preferably from 0.05 to 1.0% by mass, based on the total amount of the refrigerator lubricating oil, from the standpoint of the effect and the economic efficiency.

Examples of the acid scavenger include an epoxy compound, such as phenyl glycidyl ether, an alkyl glycidyl ether, an alkylene glycol glycidyl ether, cyclohexene oxide, an α-olefin oxide and an epoxidized soybean oil. Among these, phenyl glycidyl ether, an alkyl glycidyl ether, an alkylene glycol glycidyl ether, cyclohexene oxide, and an α-olefin oxide are preferred from the standpoint of the compatibility.

The alkyl group of the alkyl glycidyl ether and the alkylene group of the alkylene glycol glycidyl ether each may have a branch, and each generally has a number of carbon atoms of from 3 to 30, preferably from 4 to 24, and particularly from 6 to 16. The α-olefin oxide used generally has a total number of carbon atoms of from 4 to 50, preferably from 4 to 24, and particularly from 6 to 16. In the present invention, the acid scavenger may be used solely or as a combination of two or more kinds thereof. The amount thereof blended is generally from 0.005 to 5% by mass, and particularly preferably from 0.05 to 3% by mass, based on the total amount of the refrigerator lubricating oil, from the standpoint of the effect and the prevention of sludge generated.

In the present invention, the use of the acid scavenger blended can enhance the stability of the refrigerator lubricating oil. The combination use thereof with the extreme pressure agent and the antioxidant can exhibit an effect of further enhancing the stability.

Examples of the defoaming agent include a silicone oil and a fluorinated silicone oil.

Other known additives may be blended to the refrigerator lubricating oil of the present invention in such a range that does not impair the objects of the present invention.

The refrigerator lubricating oil may be mixed with a refrigerant to form a mixed composition for a refrigerator, which may be used in a refrigerator. In the mixed composition for a refrigerator, the mass ratio of the refrigerant with respect to the refrigerator lubricating oil (refrigerator lubricating oil/refrigerant) is preferably in a range of from 90/10 to 1/99, more preferably from 70/30 to 5/95, and further preferably from 60/40 to 5/95. The mass ratio within the range can provide a good refrigeration capability and a lubricating performance in a well balanced manner.

[Lubricating Method and Refrigerator]

The lubricating method of the present invention is a lubricating method including using the aforementioned refrigerator lubricating oil in a refrigerator using the aforementioned refrigerant.

The refrigerator includes the refrigerant and the refrigerator lubricating oil to be mixed with the refrigerant. The refrigerator has, for example, a compressor, a condenser, an expansion mechanism (such as an expansion valve), and an evaporator, or a compressor, a condenser, an expansion mechanism, a dryer, and an evaporator, by which a refrigeration cycle is constituted. The refrigerant used by mixing with the refrigerator lubricating oil is circulated in the refrigeration cycle, and repeatedly absorbs and releases heat. The refrigerator lubricating oil lubricates the refrigerator, for example, a sliding portion and the like of the compressor.

The refrigerator of the present invention can be applied, for example, to a refrigeration system, a hot water supply system, or a heating system, such as a car air-conditioner, a gas heat pump (GHP) system, an air conditioner, a refrigerating chamber, an automatic vending machine, a showcase, a hot water supplier, and a floor heating system, is preferably used in a car air-conditioner, such as an electric car air-conditioner and an open type car air-conditioner, and is particularly suitable for an open type car air-conditioner.

In the system, to which the refrigerator is applied, it is preferred that the water content in the system is 300 ppm by mass or less, and the residual air partial pressure therein of 10 kPa or less. The water content is more preferably 200 ppm by mass or less, and the residual air partial pressure is more preferably 5 kPa or less.

EXAMPLES

The present invention will be described in more detail with reference to examples and comparative examples below, but the present invention is not limited to the examples.

[Evaluation Methods]

<Measurement Method of Autoignition point>

The measurement method of an autoignition point accorded to ASTM E659-78.

The electric furnace and the temperature controller described in ASTM E659, Standard Test Method for Autoignition Temperature Of Liquid Chemicals, were used.

100 μL of a specimen of the refrigerator lubricating oil was collected with a syringe, and the presence of autoignition thereof was observed after setting the flask to the assumed autoignition temperature. When no autoignition was observed at the setting temperature after the lapse of 10 minutes, the observation was performed for 10 minutes after further increasing the temperature. The operation was repeated by increasing the temperature until autoignition was observed, and the temperature where autoignition was observed was designated as the autoignition point.

An autoignition point of 370° C. or more was designated as passed.

Examples and Comparative Examples

Refrigerator lubricating oils containing a base oil and an additive were prepared according to the formulations and the blending amounts shown in Tables 1 to 4, and the autoignition points of the refrigerator lubricating oils of Examples and Comparative Examples were measured according to the aforementioned evaluation method. The results are shown in Tables 1 to 4.

Tables 1 to 4 are different in the kind of the amine compound added. The difference between Examples and Comparative Examples in each of the tables is the difference in the blending amount of the amine compound added.

TABLE 1

|  |  | Example 11 | Example 12 | Example 13 | Example 14 | Example 15 | Comparative Example 11 | Comparative Example 12 | Comparative Example 13 |
|---|---|---|---|---|---|---|---|---|---|
| Refrigerator lubricating oil | Base oil *1 (% by mass) | 99 | 98 | 97 | 96 | 95 | 100 | 99.9 | 99.5 |
|  | Amine compound 1 *2 (% by mass) | 1 | 2 | 3 | 4 | 5 | 0 | 0.1 | 0.5 |
| Result | Autoignition point (° C.) | 373 | 377 | 382 | 386 | 390 | 367 | 367 | 368 |

TABLE 2

|  |  | Example 21 | Example 22 | Example 23 | Example 24 | Example 25 | Comparative Example 21 | Comparative Example 22 | Comparative Example 23 |
|---|---|---|---|---|---|---|---|---|---|
| Refrigerator lubricating oil | Base oil *1 (% by mass) | 99 | 98 | 97 | 96 | 95 | 100 | 99.9 | 99.5 |
|  | Amine compound 2 *3 (% by mass) | 1 | 2 | 3 | 4 | 5 | 0 | 0.1 | 0.5 |
| Result | Autoignition point (° C.) | 375 | 380 | 386 | 387 | 393 | 367 | 367 | 368 |

TABLE 3

|  |  | Example 31 | Example 32 | Example 33 | Example 34 | Example 35 | Comparative Example 31 | Comparative Example 32 | Comparative Example 33 |
|---|---|---|---|---|---|---|---|---|---|
| Refrigerator lubricating oil | Base oil *1 (% by mass) | 99 | 98 | 97 | 96 | 95 | 100 | 99.9 | 99.5 |
|  | Amine compound 3 *4 (% by mass) | 1 | 2 | 3 | 4 | 5 | 0 | 0.1 | 0.5 |
| Result | Autoignition point (° C.) | 372 | 377 | 380 | 384 | 388 | 367 | 367 | 368 |

TABLE 4

|  |  | Example 41 | Example 42 | Example 43 | Example 44 | Example 45 | Comparative Example 41 | Comparative Example 42 | Comparative Example 43 |
|---|---|---|---|---|---|---|---|---|---|
| Refrigerator lubricating oil | Base oil *1 (% by mass) | 99 | 98 | 97 | 96 | 95 | 100 | 99.9 | 99.5 |
|  | Amine compound 4 *5 (% by mass) | 1 | 2 | 3 | 4 | 5 | 0 | 0.1 | 0.5 |
| Result | Autoignition point (° C.) | 380 | 383 | 388 | 390 | 405 | 367 | 367 | 368 |

The notes in Tables 1 to 4 are as follows.

*1: polypropylene glycol dimethyl ether, 40° C. kinetic viscosity: 42.8 mm²/s, 100° C. kinetic viscosity: 9.52 mm²/s, hydroxyl value: 0.9 mgKOH/g
*2: dioctylphenylamine (C8C8DPA)
*3: diphenylamine (DPA)
*4: butylphenyloctylphenylamine (C4C8DPA)
*5: N-phenyl-N'-isopropyl-p-phenylamine

[Evaluation Results]

As shown in Examples 11 to 15, 21 to 25, 31 to 35, and 41 to 45, it was found that when the amine compound was contained in the refrigerator lubricating oil, the autoignition point was increased, as compared to the one containing no amine compound and the one containing the amine compound in an amount less than 1.0% by mass. In particular, the better effect of increasing the autoignition point was obtained when the blending amount of the amine compound is 3.0% by mass or more and 5.0% by mass or less based on the total amount of the refrigerator lubricating oil.

The invention claimed is:

1. A mixed composition, comprising:
a refrigerant comprising at least one unsaturated fluorinated hydrocarbon compound represented by formula (1):

$$C_pF_rH_s \quad (1),$$

wherein:
p represents an integer of from 2 to 6;
r represents an integer of from 1 to 11; and
s represents an integer of from 1 to 11,
provided that the compound has one or more carbon-carbon unsaturated bond in a molecule; and
a refrigerator lubricating oil comprising, as a major component, a polyoxyalkylene glycol compound represented by formula (2), and comprising an amine compound in an amount from 1.0% by mass or more to 5.0% by mass or less based on a total amount of the refrigerator lubricating oil, wherein the amine compound is at least one selected from the group consisting of diphenylamine, dioctylphenylamine, butylphenyloctylphenylamine, and N-phenyl-N'-isopropyl-p-phenylamine:

$$R^1-[(OR^2)_m-OR^3]_n \quad (2),$$

wherein:
R¹ is selected from the group consisting of a hydrogen atom, an alkyl group having a number of carbon atoms of from 1 to 10, an acyl group having a number of carbon atoms of from 2 to 10, an aliphatic hydrocarbon group having a number of carbon atoms of from 1 to 10 and having from 2 to 6 bonding sites, and a substituent having a number of carbon atoms of from 3 to 15 and comprising a heterocyclic ring which has oxygen, sulfur, or both, as a heteroatom;
R² independently represents an alkylene group having a number of carbon atoms of from 2 too;
R³ independently represents a hydrogen atom, an alkyl group having a number of carbon atoms of from 1 to 10, or an acyl group having a number of carbon atoms of from 2 to 10;
n represents an integer of from 1 to 6; and
m represents a number such that an average value of m×n is from 6 to 80.

2. The mixed composition according to claim 1, wherein the refrigerant consists of the at least one unsaturated fluorinated hydrocarbon compound.

3. The mixed composition according to claim 1, wherein the at least one unsaturated fluorinated hydrocarbon compound is a fluoride of propene.

4. The mixed composition according to claim 3, wherein the fluoride of propene is at least one selected from the group consisting of isomers of pentafluoropropene, 3,3,3-trifluoropropene, and 1,3,3,3-tetrafluoropropene.

5. A lubricating method, comprising operating a refrigerator with a refrigerator lubricating oil comprising:
a refrigerant comprising at least one unsaturated fluorinated hydrocarbon compound represented by formula (1):

$$C_pF_rH_s \quad (1),$$

wherein:
p represents an integer of from 2 to 6;
r represents an integer of from 1 to 11; and
s represents an integer of from 1 to 11, provided that the compound has one or more carbon-carbon unsaturated bond in a molecule;
as a major component, a polyoxyalkylene glycol compound represented by formula (2):

$$R^1-[(OR^2)_m-OR^3]_n \quad (2),$$

wherein:
R¹ is selected from the group consisting of a hydrogen atom, an alkyl group having a number of carbon atoms of from 1 to 10, an acyl group having a number of carbon atoms of from 2 to 10, an aliphatic hydrocarbon group having a number of carbon atoms of from 1 to 10 and having from 2 to 6 bonding sites, and a substituent having a number of carbon atoms of from 3 to 15 and comprising a heterocyclic ring which has oxygen, sulfur, or both, as a heteroatom;
R² independently represents an alkylene group having a number of carbon atoms of from 2 to 4;
R³ independently represents a hydrogen atom, an alkyl group having a number of carbon atoms of from 1 to 10, or an acyl group having a number of carbon atoms of from 2 to 10;
n represents an integer of from 1 to 6; and
in represents a number such that an average value of m×n is from 6 to 80; and
from 1.0% by mass or more to 5.0% by mass or less, based on a total amount of the refrigerator lubricating oil, of an amine compound, wherein the amine compound is at least one selected from the group consisting of diphenylamine, dioctylphenylamine, butylphenyloctylphenylamine, and N-phenyl-N'-isopropyl-p-phenylamine.

6. A refrigerator, comprising:
a refrigerant comprising at least one unsaturated fluorinated hydrocarbon compound represented by formula (1):

$$C_pF_rH_s \quad (1),$$

wherein:
p represents an integer of from 2 to 6;
r represents an integer of from 1 to 11; and
s represents an integer of from 1 to 11,
provided that the compound has one or more carbon-carbon unsaturated bond in a molecule;
a refrigerator lubricating oil comprising, as a major component, a polyoxyalkylene glycol compound represented by formula (2), and comprising an amine compound in an amount from 1.0% by mass or more to 5.0% by mass or less based on a total amount of the refrigerator lubricating oil, wherein the amine compound is at least one selected from the group consisting of diphenylamine, dioctylphenylamine, butylphenyloctylphenylamine, and N-phenyl-N-isopropyl-p-phenylamine:

$$R^1-[(OR^2)_m-OR^3]_n \qquad (2),$$

wherein:
R$^1$ is selected from the group consisting of a hydrogen atom, an alkyl group having a number of carbon atoms of from 1 to 10, an acyl group having a number of carbon atoms of from 2 to 10, an aliphatic hydrocarbon group having a number of carbon atoms of from 1 to 10 and having from 2 to 6 bonding sites, and a substituent having a number of carbon atoms of from 3 to 15 and comprising a heterocyclic ring which has oxygen, sulfur, or both, as a heteroatom;
R$^2$ independently represents an alkylene group having a number of carbon atoms of from 2 to 4;
R$^3$ independently represents a hydrogen atom, an alkyl group having a number of carbon atoms of from 1 to 10, or an acyl group having a number of carbon atoms of from 2 to 10;
n represents an integer of from 1 to 6; and
m represents a number such that an average value of m×n is from 6 to 80.

7. The mixed composition according to claim 1, wherein the refrigerant further comprises at least one saturated fluorinated hydrocarbon compound selected from the group consisting of 1,1-difluoroethane, trifluoroethane, tetrafluoroethane, and pentafluoroethane.

8. The mixed composition according to claim 1, wherein the mixed composition is adapted to function as a composition for a hot water supply system, a refrigerating and heating system of a car air-conditioner, an electric car air-conditioner, a gas heat pump system, an air conditioner, a refrigerating chamber, an automatic vending machine, or a showcase.

9. The mixed composition according to claim 1, wherein the mixed composition is adapted to function as a composition for a car air-conditioner or an electric car air-conditioner.

10. The mixed composition according to claim 1, wherein the mixed composition is adapted to functional as a composition for a hot water supply system or a refrigerating and heating system, and the system has a water content therein of 300 ppm by mass or less and a residual air partial pressure therein of 10 kPa or less.

11. A refrigerator lubricating oil, comprising:
at least one unsaturated fluorinated hydrocarbon compound represented by formula (1):

$$C_pF_rH_s \qquad (1),$$

wherein:
p represents an integer of from 2 to 6;
r represents an integer of from 1 to 11; and
s represents an integer of from 1 to 11,
provided that the compound has one or more carbon-carbon unsaturated bond in a molecule;
as a major component, a polyoxyalkylene glycol compound represented by formula (2):

$$R^1-[(OR^2)_m-OR^3]_n \qquad (2),$$

wherein:
R$^1$ is selected from the group consisting of a hydrogen atom, an alkyl group having a number of carbon atoms of from 1 to 10, an acyl group having a number of carbon atoms of from 2 to 10, an aliphatic hydrocarbon group having a number of carbon atoms of from 1 to 10 and having from 2 to 6 bonding sites, and a substituent having a number of carbon atoms of from 3 to 15 and comprising a heterocyclic ring which has oxygen, sulfur, or both, as a heteroatom;
R$^2$ independently represents an alkylene group having a number of carbon atoms of from 2 to 4;
R$^3$ independently represents a hydrogen atom, an alkyl group having a number of carbon atoms of from 1 to 10, or an acyl group having a number of carbon atoms of from 2 to 10;
n represents an integer of from 1 to 6; and
in represents a number such that an average value of m×n is from 6 to 80; and
from 1.0% by mass or more to 5.0% by mass or less, based on a total amount of the refrigerator lubricating oil, of an amine compound, wherein the amine compound is at least one selected from the group consisting of diphenylamine, dioctylphenylamine, butylphenyloctylphenylamine, and N-phenyl-N'-isopropyl-p-phenylamine.

\* \* \* \* \*